United States Patent [19]
Bolte et al.

[11] 3,725,506
[45] Apr. 3, 1973

[54] MANUFACTURE OF COPOLYMERS OF STYRENE AND α-METHYLSTYRENE

[75] Inventors: Herbert Bolte, Frankenthal; Paul Wittmer, Landau; Eduard Heil, Limburgerhof; Herbert Willersinn, Ludwigshafen, all of Germany

[73] Assignee: Badische Anilin-&Soda-Fabrik Aktiengesellschaft, Ludwigshafen/Rhineland Pfalz, Germany

[22] Filed: Nov. 16, 1971

[21] Appl. No.: 199,350

[30] Foreign Application Priority Data

Nov. 16, 1970 Germany....................P 20 56 197.1

[52] U.S. Cl. .............................................260/88.2 C
[51] Int. Cl. .........................C08f 19/02, C08f 19/04
[58] Field of Search......................260/88.2 C, 93.5 S

[56] References Cited

UNITED STATES PATENTS

| | | | |
|---|---|---|---|
| 3,036,053 | 5/1962 | Doak | 260/88.2 |
| 3,530,105 | 9/1970 | Dennis | 260/88.2 |
| 3,640,979 | 2/1972 | Baba | 260/82.1 |

*Primary Examiner*—James A. Seidleck
*Assistant Examiner*—Roger S. Benjamin
*Attorney*—Johnston, Root, O'Keefe, Keil, Thompson & Shurtleff

[57] ABSTRACT

Continuous process for the manufacture of copolymers of styrene and α-methylstyrene having a substantially statistical distribution of the monomers by anionic polymerization at low temperatures with thorough mixing of the reactants.

The process is characterized in that at least part of the heat of reaction is removed by evaporative cooling and that the monomers are fed to the polymerization zone at different points.

3 Claims, No Drawings

MANUFACTURE OF COPOLYMERS OF STYRENE AND α-METHYLSTYRENE

This invention relates to a continuous process for the manufacture of copolymers of styrene and α-methylstyrene having a substantially statistical distribution of the monomers.

The preparation of copolymers from styrene and α-methylstyrene is well known, for example by anionic polymerization, in which the mixture of monomers is reacted in the presence of ethers using alkali metal catalysts and low temperatures. When large batches are used, difficulties occur due to the very rapid polymerization reaction and the large amounts of heat which are thus generated. Consequently, the reaction is difficult to control and is thus not very suitable for commercial-scale operation.

It is an object of the invention to provide a method of controlling the heat of polymerization which enables the reaction to be carried out on an industrial scale.

It is another object of the invention to provide copolymers having a substantially statistical distribution of the monomers and exhibiting a high softening point and only slight degradation at high temperatures.

In accordance with this invention these objects are achieved by a process for the manufacture of copolymers of styrene and α-methylstyrene by anionic polymerization in the presence of ethers at low temperatures wherein the polymerization is carried out continuously at subatmospheric pressure such that at least part of the heat of reaction is removed by evaporative cooling and that the reaction temperature used is not more than +20°C and preferably not more than 0°C.

In a preferred embodiment, polymerization is carried out with thorough mixing of the components, the monomers α-methylstyrene and styrene being fed to the polymerization zone at different points. It has been found that this embodiment not only ensures a smooth course of reaction in a commercial plant but also gives copolymers having a substantially statistical monomer distribution. Such copolymers are of particular interest due to their high Vicat softening points. Their tendency to degrade at high temperatures is substantially less than that shown by polymers having relatively long and continuous sequences of the same monomer.

The process of the invention may be carried out using the alkali metal catalysts normally employed in anionic polymerization reactions. Use may be made not only of alkali metals themselves, in particular sodium, potassium or lithium, and their alloys or mixtures, but also of alkali metal hydrides, alkali metal adducts with aromatic hydrocarbons and organo-alkali metal compounds.

Particularly suitable ethers in the presence of which the polymerization is carried out are cyclic ethers, for example tetrahydrofuran and dioxane.

Polymerization is carried out in an inert atmosphere and with the exclusion of water, carbon dioxide, oxygen and the like. The polymerization temperature is below +20°C and preferably below 0°C. The lower temperature limit is not generally lower than −30°C. The pressure at which the reaction is carried out is adjusted by applying a vacuum. It should be such that evaporative cooling occurs and the maximum reaction temperature does not exceed +20°C. For example, at −10°C a pressure of 25 mm Hg is used and at 30 mm Hg the boiling point of the mixture is −5°C.

The ratio of styrene to α-methylstyrene, the comonomers to be polymerized with each other, may be varied within wide limits and is generally in the range 95:5 to 20:80. Ratios of styrene to α-methylstyrene of from 70:30 to 40:60 are preferred.

Chain-stopping may be effected in a conventional manner, for example by adding carboxylic acids.

The invention is further illustrated by the following Examples in which parts are by weight.

COMPARATIVE EXAMPLE

A reactor is used which is equipped with a discharge pump and means for removing the heat of polymerization by evaporative cooling and which is kept at a pressure of 25 mm Hg. A mixture of 50 parts of pure styrene, 50 parts of pure α-methylstyrene and 400 parts of pure tetrahydrofuran and a solution of 0.129 part of naphthalene sodium in 10 parts of tetrahydrofuran are continuously fed to the reactor with the exclusion of water and air. The streams of monomer, solvent and catalyst are combined and mixed before entering the reactor. The polymerization reaction taking place in the reactor generates heat which is removed by evaporation of a portion of the tetrahydrofuran while the contents of the reactor are kept at a constant temperature of −10°C. The solvent vapors are condensed and the condensate is recycled to the reactor. The dark-red copolymer solution is continuously withdrawn from the reactor and inactivated in a mixer by the addition of 1 percent of methanol and then supplied to a suitable apparatus for the removal of solvent by evaporation.

There is obtained a copolymer consisting of 55 parts of styrene and 45 parts of α-methylstyrene (determined by infrared analysis). The Vicat softening point is 118°C. When the product is heated at 260°C for 2 hours at a pressure of 0.2 mm Hg, a loss of weight of 25 percent occurs due to degradation.

EXAMPLE OF THE INVENTION

The same amounts of monomer, solvent and catalyst are fed to the reactor as described in Example 1, but the streams are not combined and mixed before entering the reactor. Instead, a mixture of 50 parts of pure styrene and 200 parts of pure tetrahydrofuran is fed to the liquid contents of the reactor through a pipe which dips beneath the surface of said liquid contents, whilst a mixture of 50 parts of α-methylstyrene, 210 parts of tetrahydrofuran and 0.129 part of naphthalene sodium is pumped into the liquid contents of the reactor at a different point through a separate dipleg. The contents of the reactor are very thoroughly mixed by a stirrer. Polymerization and working up are effected as described in Example 1.

There is obtained a copolymer consisting of 55 parts of styrene and 45 parts of α-methylstyrene (determined by infrared analysis). The Vicat softening point is 126°C. When the product is heated at 260°C for 2 hours at a pressure of 0.2 mm Hg, the loss of weight due to degradation is only 6.5 percent.

We claim:

1. A process for the continuous manufacture of copolymers of styrene and α-methylstyrene having a ratio of styrene to α-methylstyrene of from 95:5 to 20:80 by anionic polymerization of the mixture of monomers with alkali metal catalysts in the presence of ethers at subatmospheric pressure and at temperatures below +20°C with thorough mixing of the reactants, which comprises carrying out the polymerization at subatmospheric pressure such that at least part of the heat of reaction is removed by evaporative cooling, and feeding the monomers to the polymerization zone at different points.

2. A process as claimed in claim 1, wherein polymerization is carried out at a temperature between 0° and −30°C.

3. A process as claimed in claim 2 wherein the ratio of styrene to α-methylstyrene is from 70:30 to 40:60.

* * * * *